H. P. GREGG.
Corn-Planter.
No. 61,534.
2 Sheets—Sheet 1.
Patented Jan. 29, 1867.
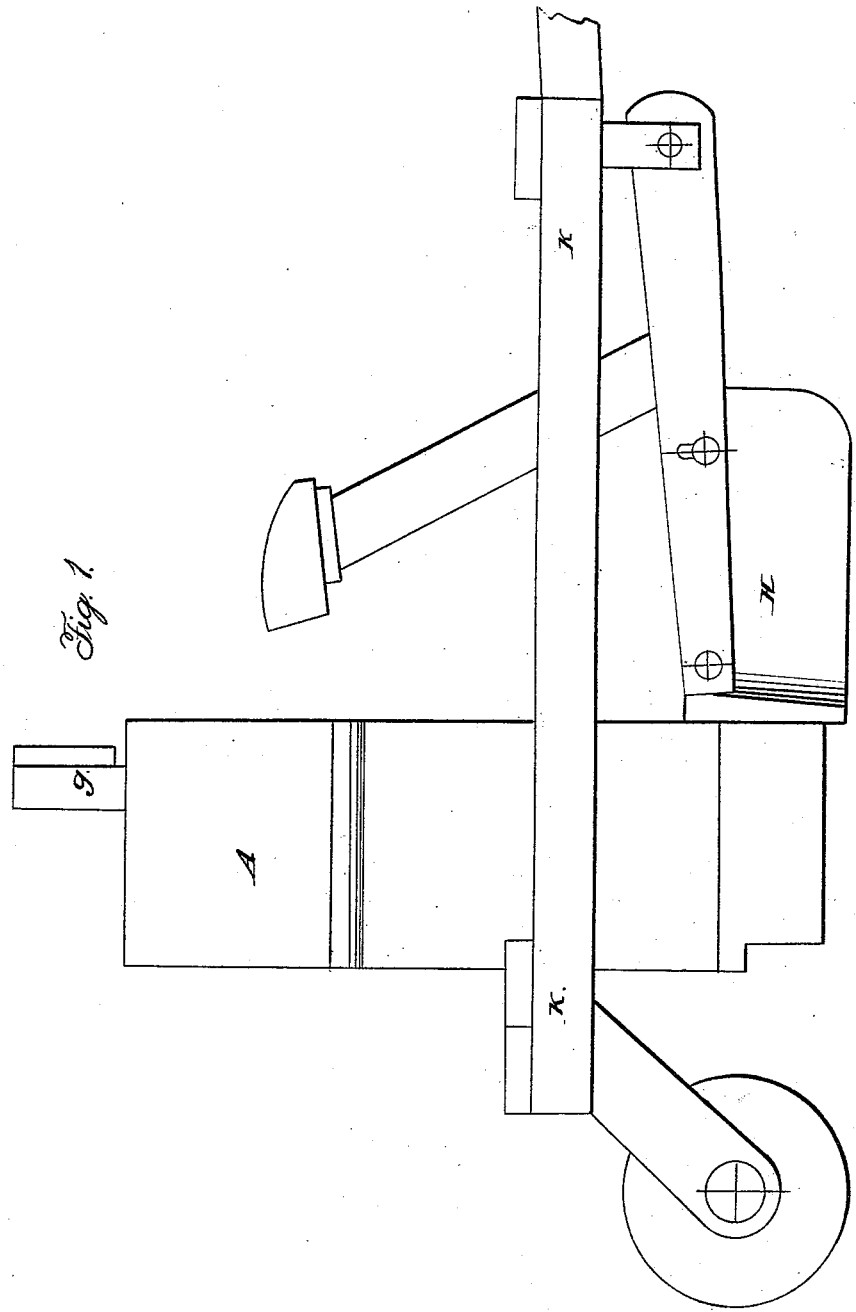

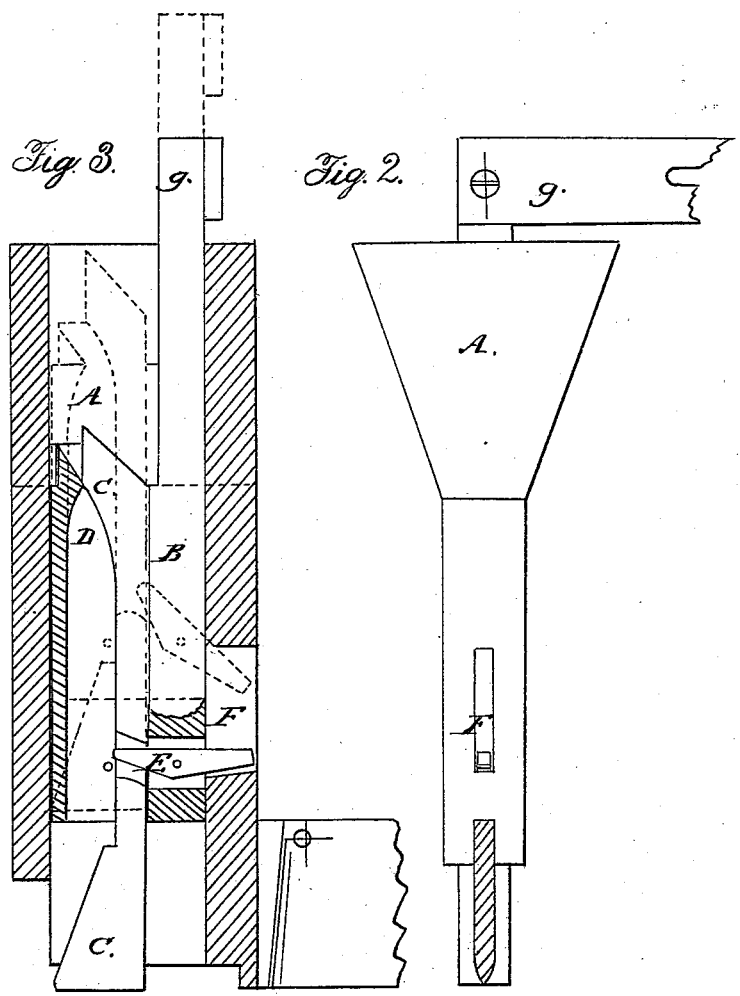

United States Patent Office.

HENRY P. GREGG, OF ROSCOE, OHIO.

Letters Patent No. 61,534, dated January 29, 1867.

IMPROVEMENT IN SEEDING MACHINE.

*The Schedule referred to in these Letters Patent and making part of the same.*

TO ALL WHOM IT MAY CONCERN:

Be it known that I, HENRY P. GREGG, of Roscoe, in the county of Coshocton, and State of Ohio, have invented a new and useful Machine for Dropping Corn or other Grain; and I do hereby declare that the following is a full, clear, and exact description of the construction and operation of the same, reference being had to the annexed drawings, making part of this specification, in which—

Figure 1 is a diagram of the machine.

Figure 2 is a side elevation of the valve-box and hopper.

Figure 3 is a section of the hopper, and partial section of the valve-box.

To enable others to make and use my invention, I will proceed to describe its construction and operation.

Letter A represents the hopper or box for holding the grain, with a box attached to the bolter for the valve-box to work up and down in. There are two of these used, which are each attached to a plough for parting the ground to admit of the grain. These ploughs, shown at H in fig. 1, are attached to two arms pivoted at one end to a frame, K K, which is supported at the back end by two wheels, the forward end being attached to the horses by a tongue or shafts, the hopper and ploughs having a chance to raise and lower when passing over irregular ground, the driver riding on the same. B in fig. 3 is the valve-box, which is made to fit closely inside of the box at the bottom of the hopper. In the valve-box is the valve C C, valve-seat D, lever and fulcrum E, with one end passing out through the slot in the hopper-box, shown at F, fig. 2. The red lines in fig. 3 show the position of the valve-box and valve when raised up.

The operation: By taking hold of the arm or cross-piece g and raising it, the valve-box and valve are raised at the same time until the lever E strikes the upper part of the slot F, and gives an increased movement to the valve, as shown by the red lines, which admits of the grain passing down from the cup shown at the valve-seat D when the valve-box is dropped. The lever going down admits the valve upon the seat before the small measuring cup gets into the grain in the hopper, and when the valve-box has finished its movement, the lower valve C has opened its port and discharged the grain on the ground. By this arrangement the measuring cup is filled when going down, and the grain that had passed the opening or valve at the top is then discharged at the bottom. By reversing the movement the grain is admitted into the valve-box from the measuring cup after it has been raised entirely out of the grain in the hopper, and the upper valve closes before the measuring cup passes into the grain, and as the downward movement is finished the grain in the valve-box is discharged at the bottom.

Claim.

What I claim as new, and desire to secure by Letters Patent, is—

The valve-box B, valve C, valve-seat, and measuring cup D.

HENRY P. GREGG.

Witnesses:
W. G. BAKER,
HENRY C. SERGEANT.